US012553013B2

(12) United States Patent
Fuller et al.

(10) Patent No.: US 12,553,013 B2
(45) **Date of Patent: *Feb. 17, 2026**

(54) WATER-SOLUBLE AUTOMATIC DISHWASHING DETERGENT POUCH

(71) Applicant: The Procter & Gamble Company, Cincinnati, OH (US)

(72) Inventors: Linsey Sarah Fuller, Newcastle upon Tyne (GB); Lindsay Suzanne Bewick, Whitley Bay Tyne & Wear (GB); Neil Joseph Lant, Newcastle upon Tyne (GB); Robert William John Sterry, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,786

(22) Filed: Jul. 19, 2024

(65) Prior Publication Data

US 2025/0101349 A1 Mar. 27, 2025

(30) Foreign Application Priority Data

Jul. 20, 2023 (EP) .................................... 23186828

(51) Int. Cl.

| | |
|---|---|
| ***C11D 17/04*** | (2006.01) |
| ***C11D 3/08*** | (2006.01) |
| ***C11D 3/28*** | (2006.01) |
| ***C11D 3/33*** | (2006.01) |
| ***C11D 3/37*** | (2006.01) |
| ***C11D 3/386*** | (2006.01) |

(52) U.S. Cl.

CPC .............. *C11D 17/044* (2013.01); *C11D 3/08* (2013.01); *C11D 3/28* (2013.01); *C11D 3/33* (2013.01); *C11D 3/3707* (2013.01); *C11D 3/3761* (2013.01); *C11D 3/38609* (2013.01); *C11D 2111/18* (2024.01)

(58) Field of Classification Search

CPC ..... C11D 3/38609; C11D 17/042; C11D 3/28; C11D 3/3761; C11D 3/3707; C11D 17/044; C11D 3/33; C11D 3/08; C11D 2111/18; C11D 2111/14

See application file for complete search history.

(56) References Cited

U.S. PATENT DOCUMENTS

| | | | | |
|---|---|---|---|---|
| 3,759,833 | A | 9/1973 | Easton | |
| 2021/0040417 | A1* | 2/2021 | Arlabosse ............ | C11D 3/2079 |
| 2023/0042669 | A1* | 2/2023 | Al-Bayati ............ | C11D 3/2082 |
| 2023/0140001 | A1* | 5/2023 | Davies ................. | C11D 17/042 510/224 |

FOREIGN PATENT DOCUMENTS

| | | | |
|---|---|---|---|
| EP | 0266904 | A2 | 5/1988 |
| EP | 0463802 | A1 | 1/1992 |
| JP | 2009149777 | A | 7/2009 |
| WO | 1994005763 | A1 | 3/1994 |
| WO | 1995012652 | A1 | 5/1995 |
| WO | 2021180587 | A1 | 9/2021 |
| WO | 2022200053 | A1 | 9/2022 |

OTHER PUBLICATIONS

Extended EP Search Report and Opinion for 23186828.2 dated Jan. 16, 2024, 07 Pages.

* cited by examiner

*Primary Examiner* — Vishal V Vasisth

(74) *Attorney, Agent, or Firm* — Elizabeth A. Conklin; Carolyn S. Powell

(57) ABSTRACT

A water-soluble automatic dishwashing detergent pouch includes an automatic dishwashing detergent composition that is enclosed by a water-soluble film. The automatic dishwashing detergent composition includes dipicolinic acid and/or salt thereof; and from above about 0 g to less than about 8.0 g silicate salt, with the level of silicate salt being less than about 3.0 wt. % of the automatic dishwashing detergent composition. The weight ratio of dipicolinic acid and/or salt thereof to silicate salt is greater than about 5:1.

16 Claims, No Drawings

WATER-SOLUBLE AUTOMATIC DISHWASHING DETERGENT POUCH

TECHNICAL FIELD

The present disclosure relates to a water-soluble automatic dishwashing detergent pouch comprising an automatic dishwashing detergent composition. The automatic dishwashing detergent pouch of the present disclosure provides good care performance, and especially good glass care performance. The automatic dishwashing detergent pouch of the present disclosure provide good shine performance to glassware.

BACKGROUND

Unit dose detergent articles are particularly popular with consumers. The ease of use and consistent performance are two characteristics that consumers find desirable. For automatic dishwashing applications, unit dose detergent articles in water-soluble pouch form are very popular with consumers.

Water-soluble automatic dishwashing detergent pouches comprise an automatic dishwashing detergent composition that is enclosed by a water-soluble film. During the washing cycle, the detergent chemistry is released into the washing zone of the automatic dishwashing appliance and helps treat the dishware to be cleaned.

Detergent formulators are always seeking to improve the care performance of these automatic dishwashing detergent pouches, especially glass care performance. One such glass care performance vector is the clarity of glassware (shine performance) after it has been washed by the water-soluble automatic dishwashing detergent pouch.

The inventors have found that the combination of dipicolinic acid and/or salt thereof with a controlled amount of silicate salt improves the glass care performance of the pouch, and especially provides clear glassware after treatment.

SUMMARY

The present disclosure provides a water-soluble automatic dishwashing detergent pouch, wherein the pouch comprises an automatic dishwashing detergent composition that is enclosed by a water-soluble film, wherein the automatic dishwashing detergent composition comprises:

(a) dipicolinic acid and/or salt thereof; and (b) from above 0 g to less than 8.0 g silicate salt, with the level of silicate salt being less than 3.0 wt. % of the automatic dishwashing detergent composition, and wherein the weight ratio of dipicolinic acid and/or salt thereof to silicate salt is greater than 5:1.

DETAILED DESCRIPTION

Water-Soluble Automatic Dishwashing Detergent Pouch.

The pouch comprises an automatic dishwashing detergent composition that is enclosed by a water-soluble film.

The pouch can be a single compartment pouch comprising only one compartment. Typically for this example, the automatic dishwashing detergent composition is contained within this single compartment.

The pouch may also be a multi-compartment pouch, comprising more than one compartment. Typically, these separate compartments are separated by water-soluble film.

The multi-compartment pouch may have a side-by-side configuration. In this manner, the separate compartments are typically sealed together so that at least one compartment is side by side to another compartment.

The multi-compartment pouch may have a superposed configuration. In this manner, the separate compartments are typically sealed together so that at least one compartment is superposed on top of another compartment.

Multi-compartment pouches can be preferred when the automatic dishwashing detergent composition comprises both a solid component and a liquid component. The multi-compartment pouch can comprise the liquid component in one or more separate compartments to the solid component. However, multi-compartment pouches can also be suitable when the automatic dishwashing detergent composition comprises only a solid component or only a liquid component.

Single compartment pouches can be preferred when the automatic dishwashing detergent composition comprises only a solid component or only a liquid component. However, single compartment pouches can also be suitable when the automatic dishwashing detergent composition comprises both a solid component and a liquid component, for example, the solid component may be a discontinuous phase that is dispersed within the liquid component that is a continuous phase, or the liquid component is in the form of a gel and is in direct contact with, such as layered onto, the powder component.

The multi-compartment pouch may comprise two or more compartments, or three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the compartments comprising the liquid component to be in a side-by-side configuration.

It may be preferred for the compartment(s) comprising the liquid component to be superposed on top of the compartment(s) comprising the solid component.

It may be preferred for the solid component to be contained within only one single compartment within the pouch.

It may be preferred for the liquid component to be contained within two or more compartments within the pouch, or even three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the solid component to be contained within only one single compartment within the pouch, and it may be preferred for the liquid component to be contained within two or more compartments within the pouch, or even three or more compartments, or four or more compartments, or five or more compartments, or even six or more compartments, and preferably from 2 to 10 compartments, or from 3 to 9 compartments, or from 4 to 8 compartments, or even from 5 to 7 compartments.

It may be preferred for the compartment(s) that contain the liquid component to be super-posed on top of the compartment(s) that contain the solid component. If the liquid component is contained within more than one compartment, it may be preferred for these compartments to be in a side-by-side configuration. If the solid component is contained within more than one compartment, it may be preferred for these compartments to be in a side-by-side configuration Typically, the pouch has the following dimensions (i) a maximum length of from 30 mm to 90 mm;
(ii) a maximum width of from 30 mm to 54 mm;
(iii) a maximum height of from 8 mm to 41 mm; and
(iv) a maximum internal compartment volume of from 10 ml to 199 ml.

Typically, the weight of the pouch is in the range of from 10 g to 30 g, preferably from 11 g to 26 g, or from 12 g to 24 g, or even from 13 g to 20 g.

Typically, the pouch comprises from 9.0 g to 29.7 g, or from 10.0 g to 25.7 g, or from 11.0 g to 23.7 g, or from 12.0 g to 19.7 g of the automatic dishwashing detergent composition.

The automatic detergent dishwashing detergent composition can be made up of from 0.5 g to 10 g, or from 0.6 g to 9.0 g, or from 0.7 g to 8 0 g, or from 0.8 g to 7.0 g, or from 0.9 g to 6.0 g, or from 0.9 g to 5.0 g, or from 1.0 g to 4.0 g liquid component.

The automatic detergent dishwashing detergent composition can be made up of from 4.0 g to 28 g, or from 5.0 g to 26 g, or from 6.0 g to 24 g, or from 7.0 g to 22 g, or from 8.0 g to 20 g, or from 10 g to 18 g, or from 13 g to 16 g solid component.

Typically, the pouch comprises from 0.3 g to 1.0 g, or from 0.35 g to 0.9 g, or from 0.4 g to 0.8 g, or from 0.5 g to 0.7 g water-soluble film.

Automatic Dishwashing Detergent Composition.

The automatic dishwashing detergent composition comprises:

(a) dipicolinic acid and/or salt thereof; and
(b) from above 0 g to less than 8.0 g silicate salt, with the level of silicate salt being less than 3.0 weight percent (wt. %), preferably less than 2.5 wt. %, or preferably less than 2.0 wt. %, of the automatic dishwashing detergent composition, and wherein the weight ratio of dipicolinic acid and/or salt thereof to silicate salt is greater than 5:1, preferably from greater than 5:1 to less than 20:1, more preferably from 7:1 to 15:1.

Preferably, the composition comprises:

(a) from 1.0 g to 20 g, preferably from 2.0 g to 10 g dipicolinic acid and/or salt thereof; and
(b) from 0.1 g to less than 8.0 g, preferably from 0.1 g to 4.0 g, more preferably from 0.1 g to 2.0 g silicate salt.

A suitable dipicolinic acid and/or salt is dipicolinic acid. A suitable dipicolinic acid and/or salt is selected from alkali metal salts of dipicolinic acid, alkaline earth metal salts of dipicolinic acid, and any combination thereof. A suitable dipicolinic acid and/or salt is an alkali metal salt of dipicolinic acid. A suitable dipicolinic acid and/or salt is a sodium salt of dipicolinic acid.

Preferably, the silicate salt is an alkali metal salt of silicate. Preferably, the silicate salt is sodium silicate.

Preferably, the dipicolinic acid and/or salt thereof is present in a solid component of the detergent composition.

The composition may comprise transition metal bleach catalyst.

Preferably, the transition metal bleach catalyst is a manganese transition metal bleach catalyst. Alternatively, the transition metal bleach catalyst is a cobalt transition metal bleach catalyst.

The composition may have a low pH profile. The composition may, upon dilution in deionized water at 20° C. temperature to a concentration of 10 g/l the composition has an equilibrium pH of less than 10.0, or less than 9.5, or from 7.0 to less than 10.0, or from 7.0 to less than 9.5.

The composition may comprise polyepoxy succinic acid polymer. The composition may comprise from 0.1 g to 5.0 g, preferably from 0.5 g to 2.0 g, polyepoxy succinic acid polymer.

The composition may comprise sulphonated carboxylate polymer. The composition may comprise from 0.1 g to 5.0 g, preferably from 0.5 g to 2.0 g, sulphonated carboxylate polymer.

The composition may comprise enzyme. The composition may comprise amylase and/or protease.

The composition may comprise methylglycine diacetic acid and/or a salt thereof.

The water-soluble film may comprise polyvinyl alcohol.

The present disclosure also provides a method of washing dishware in an automatic dishwashing machine, wherein the pouch according to the present disclosure is contacted with dirty dishware in an automatic dishwashing machine in the presence of water.

Typically, the composition is in solid form and/or liquid form. Preferably, the composition comprises a solid component and a liquid component. The solid component and/or liquid component are typically contained within separate compartments within the pouch. Typically, these separate compartments are separated by water-soluble film. These separate compartments can be in a side-by-side configuration, or (and preferably) in a superposed configuration. Typically, the compartment(s) containing the liquid component is/are superposed on top of the compartment(s) comprising the solid component. The solid component is typically contained within one compartment within the pouch. The liquid component is typically contained within more than one compartment within the pouch, such as two or more compartments, or three or more compartments, or four or more compartments, or five or more compartments, or even six or more compartments, and preferably from 2 to 10 compartments, or from 3 to 9 compartments, or from 4 to 8 compartments, or even from 5 to 7 compartments.

The liquid component, or part thereof, may be contained within a compartment that also contains the solid component, or part thereof. It may be preferred that the liquid component, or part thereof, forms a continuous phase within the compartment, and the solid component, or part thereof, forms a discontinuous phase.

The solid component, or part thereof, may be in the form of a free-flowing powder, or a tablet, preferably a free-flowing powder. The free-flowing powder may be compressed when contained in a compartment of the pouch.

The solid component, especially when in free-flowing powder form, can have a bulk density in the range of from 400 g/l to 1200 g/l, or from 600 g/l to 1000 g/l.

The liquid component, or part thereof, may be a free-flowing liquid, or may be a viscous liquid. The liquid component, or part thereof, may be a gel.

The liquid component, or part thereof, can have a viscosity in the range of from 50 cP to 750 cP, or from 100 cP to 500 cP.

Viscosity is typically measured using a rheometer. The viscosity is typically measured at a function of shear rate of from 1.0 $s^{-1}$ to 1500 $s^{-1}$, and at a temperature of from 10° C. to 30° C.

The composition typically comprises one or more of an alkalinity system, a bleach system, a builder system, a chelant system, an enzyme system, a polymer system, and a surfactant system. The composition can also include other detergent ingredients.

Solid detergent ingredients are typically comprised by the solid component. Liquid detergent ingredients are typically comprised by the liquid component. However, a liquid detergent ingredient can be formulated into a solid particle: e.g., by loading onto a solid carrier material, or a liquid ingredient can be sprayed-on or agglomerated into the solid component. In this manner, a liquid detergent ingredient can be comprised by the solid component.

The alkalinity system, or part thereof, can be comprised by the liquid component and/or the solid component. Typically, the alkalinity system, or part thereof, is comprised by the solid component.

The bleach system, or part thereof, can be comprised by the liquid component and/or the solid component. Typically, the bleach system, or part thereof, is comprised by the solid component.

The builder system, or part thereof, can be comprised by the liquid component and/or the solid component. Typically, the builder system, or part thereof, is comprised by the solid component.

The chelant system, or part thereof, can be comprised by the liquid component and/or the solid component. Typically, the chelant system, or part thereof, is comprised by the solid component.

The enzyme system, or part thereof, can be comprised by the liquid component and/or the solid component. The enzyme system, or part thereof, may be comprised by the liquid component. The enzyme system, or part thereof, may be comprised by the solid component. Part of the enzyme system may be comprised by the liquid component and part of the enzyme system may be comprised by the solid component.

The polymer system, or part thereof, can be comprised by the liquid component and/or the solid component. The polymer system, or part thereof, may be comprised by the solid component. Part of the polymer system may be comprised by the liquid component and part of the polymer system may be comprised by the solid component.

The surfactant system, or part thereof, can be comprised by the liquid component and/or the solid component. The surfactant system, or part thereof, may be comprised by the liquid component. The surfactant system, or part thereof, may be comprised by the solid component. Part of the surfactant system may be comprised by the liquid component and part of the surfactant system may be comprised by the solid component.

Water-Soluble Film.

The water-soluble film preferably has a thickness of from 20 to 150 microns, preferably from 35 to 125 microns, or even more preferably from 50 to 110 microns, most preferably about 76 microns.

The water-soluble film is typically soluble or dispersible in water. Preferably, the film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility (or dispersibility) can be calculated.

The water-soluble film material may be obtained by casting, blow-moulding, extrusion or blown extrusion of the polymeric material, as known in the art.

The water-soluble film preferably comprises polyvinylalcohol (PVA). The polyvinylalcohol may be present between 50% and 95%, preferably between 55% and 90%, more preferably between 60% and 80% by weight of the water-soluble film. The polyvinylalcohol preferably comprises polyvinyl alcohol homopolymer, polyvinylalcohol copolymer, or a mixture thereof. Preferably, the water-soluble film comprises a blend of polyvinylalcohol homopolymers and/or anionic polyvinylalcohol copolymers, preferably wherein the polyvinylalcohol copolymers are selected from sulphonated and carboxylated anionic polyvinylalcohol copolymers especially carboxylated anionic polyvinylalcohol copolymers, most preferably the water-soluble film comprises a blend of a polyvinylalcohol homopolymer and a carboxylated anionic polyvinylalcohol copolymer, or a blend of polyvinylalcohol homopolymers. Alternatively, the polyvinylalcohol comprises an anionic polyvinyl alcohol copolymer, most preferably a carboxylated anionic polyvinylalcohol copolymer. When the polyvinylalcohol in the water-soluble film is a blend of a polyvinylalcohol homopolymer and a carboxylated anionic polyvinylalcohol copolymer, the homopolymer and the anionic copolymer are present in a relative weight ratio of 90/10 to 10/90, preferably 80/20 to 20/80, more preferably 70/30 to 50/50. Without wishing to be bound by theory, the term "homopolymer" generally includes polymers having a single type of monomeric repeating unit (e.g., a polymeric chain comprising or consisting of a single monomeric repeating unit). For the case of polyvinylalcohol, the term "homopolymer" typically further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol, the term "copolymer" (or "polyvinylalcohol copolymer") typically further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units, for example anionic monomer units). In the case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %.

Preferably, the polyvinyl alcohol, and/or in case of polyvinylalcohol blends the individual polyvinylalcohol polymers, have an average viscosity (μl) in a range of between 4 mPa·s and 30 mPa·s, preferably between 10 mPa·s and 25 mPa·s, measured as a 4% polyvinyl alcohol polymer solution in demineralized water at 20° C.

The viscosity of a polyvinyl alcohol polymer is typically determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 30,000 to 175,000, or 30,000 to 100,000, or 55,000 to 80,000.

Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%.

A suitable test method to measure the degree of hydrolysis is as according to standard method JIS K6726.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 molecular weight, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the water-soluble film comprises lubricants/release agents. Suitable lubricants/release agents include fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film is typically in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include starches, modified starches, crosslinked polyvinylpyrrolidone, crosslinked cellulose, microcrystalline cellulose, silica, metallic oxides, calcium carbonate, talc and mica. Preferred materials are starches, modified starches and silica.

Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film has a residual moisture content of at least 4%, more preferably in a range of from 4% to 15%, even more preferably of from 5% to 10% by weight of the water-soluble film, typically as measured by Karl Fischer titration.

Preferred water-soluble films exhibit good dissolution in cold water, meaning unheated distilled water. Preferably, such water-soluble films exhibit good dissolution at temperatures of 24° C., even more preferably at 10° C. By good dissolution it is typically meant that the water-soluble film exhibits a water-solubility of at least 50%, preferably at least 75% or even at least 95%, as measured by the method set out here after using a glass-filter with a maximum pore size of 20 microns, described above.

Preferred films include those supplied by Monosol under the trade references M8630, M8900, M8779, M8310.

The film may be opaque, transparent, or translucent.

The film may comprise a printed area. The area of print may be achieved using standard techniques, such as flexographic printing or inkjet printing. Preferably, the ink used in the printed area comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Detergent Ingredients

Suitable detergent ingredients can be described in terms of systems. The composition typically comprises one or more of an alkalinity system, a bleach system, a builder system, a chelant system, an enzyme system, a polymer system, and a surfactant system. Suitable detergent ingredients can also include other detergent ingredients.

Alkalinity System.

The alkalinity system typically achieves the target pH profile of the composition. The pH profile of the composition impacts the cleaning profile of the composition. Alkalinity typically provides soil swelling and soil dispersion performance, as well as providing the optimal pH for other detergent ingredients to work, such as the bleach system, builder system, chelant system and enzyme system.

The composition typically comprises from 1.0 g to 10 g alkalinity system. The amount of alkalinity system is typically determined by the desired pH profile of the composition.

Any suitable source of alkalinity can be used. Suitable sources of alkalinity are organic alkaline ingredients and inorganic alkaline ingredients.

A suitable alkalinity system comprises ingredients selected from carbonate salts, silicate salts, and sources of hydroxide anions.

The composition can comprise from 1.0 g to 10 g carbonate salt.

Preferred carbonate salts are selected from alkali metal salts of carbonate and/or alkaline earth metal salts of carbonate. Preferred carbonate salts are selected from magnesium carbonate, potassium carbonate, sodium carbonate, and any combination thereof, most preferably sodium carbonate.

Preferably, the composition comprises from 1.0 g to 10 g sodium carbonate.

The composition can comprise from 0.1 g to 5.0 g silicate salt.

Preferred silicate salts are selected from alkali metal salts of silicate and/or alkaline earth metal salts of silicate. Preferred silicate salts are selected from magnesium silicate, potassium silicate, sodium silicate, and any combination thereof, most preferably sodium silicate. Preferred sodium silicates have a weight ratio $SiO_2$ to $Na_2O$ ratio of from 1.0:1 to 3.5:1, preferably from 1.5:1 to 2.5:1, most preferably 2.0:1 (sodium disilicate).

Preferably, the composition comprises from 0.1 g to 5.0 g sodium silicate.

The composition may comprise from 0.01 g to 2.0 g source of hydroxide.

Preferred sources of hydroxide are selected from alkali metal hydroxide and/or alkaline earth metal hydroxide. Preferred sources of hydroxide are selected from magnesium hydroxide, potassium hydroxide, sodium hydroxide, and any combination thereof, most preferably sodium hydroxide.

Bleach System.

Typically, the bleach system provides cleaning and disinfection benefits.

Typically, the composition comprises from 0.1 g to 10 g bleach system.

The bleach system typically comprises a source of peroxygen, often in combination with a bleach activator and/or a bleach catalyst.

Typically, the composition comprises from 0.1 g to 10 g, or from 1.0 g to 8.0 g, or from 2.0 g to 6.0 g source of peroxygen.

Any suitable source of peroxygen can be used. A suitable source of peroxygen is a perhydrate salt, especially alkali metal perhydrate salts and/or alkaline earth metal perhydrate salts, preferably alkali metal perhydrate salts. Suitable perhydrate salts are selected from perborate salt, percarbonate salt, perphosphate salt, persilicate salt, persulfate salt and any combination thereof.

The perhydrate salt may be a crystalline solid without additional protection. Alternatively, the perhydrate salt can be coated. Suitable coatings are selected from sodium carbonate, sodium silicate, sodium sulphate, and any combination thereof.

A preferred perhydrate salt is an alkali metal percarbonate, especially preferred is sodium percarbonate. The percarbonate is preferably in a coated form. The coating provides in-product stability.

The composition may comprise from 1.0 g to 10 g, or from 2.0 g to 6.0 g sodium percarbonate.

Another suitable source of peroxygen is a pre-formed peracid. A preferred pre-formed peracid is phthalimidoperoxycaproic acid (PAP).

The composition may comprise from 0.1 g to 5.0 g phthalimidoperoxycaproic acid (PAP).

The composition may comprise a bleach activator. The composition may comprise from 0.05 g to 2.0 g, preferably from 0.1 g to 2.0 g, bleach activator. Any suitable bleach activator can be used. Bleach activators are typically used to enhance the bleaching performance at temperatures of 60° C. and below.

A suitable bleach activator is an organic peracid precursor. Suitable bleach activators are compounds which, under perhydrolysis conditions, give aliphatic peroxycarboxylic acids having preferably from 1 to 12 carbon atoms, in particular from 2 to 10 carbon atoms, and/or optionally substituted perbenzoic acid. Suitable bleach activators comprise O-acyl and/or N-acyl groups of the number of carbon atoms specified and/or optionally substituted benzoyl groups. Preferred bleach activators are polyacylated alkylenediamines. A highly preferred bleach activator is tetraacetylethylenediamine (TAED).

The composition may comprise from 0.05 g to 2.0 g, preferably from 0.1 g to 2.0 g, tetraacetylethylenediamine (TAED).

The composition may comprise a bleach catalyst. The composition may comprise from 0.1 mg to 20 mg, preferably from 0.5 mg to 10 mg, bleach catalyst. Any suitable bleach catalyst can be used.

Suitable bleach catalysts are metal-containing bleach catalysts, preferably transition-metal-containing bleach catalysts. Preferred transition-metal-containing bleach catalysts are selected from cobalt-containing bleach catalysts, iron-containing bleach catalysts, manganese-containing bleach catalysts, and any combination thereof.

Suitable manganese-containing bleach catalysts comprise manganese in an oxidation state of (II), (III), (IV), (v), or any combination thereof, preferably (IV).

Suitable manganese-containing bleach catalyst includes manganese triazacyclononane and related complexes, such as 1,4,7-triazacyclononane (TACN).

The composition may comprise from 0.1 mg to 20 mg, preferably from 0.5 mg to 10 mg, transition-metal-containing bleach catalyst. The composition may comprise from 0.1 mg to 20 mg, preferably from 0.5 mg to 10 mg, cobalt-containing bleach catalyst. The composition may comprise from 0.1 mg to 20 mg, preferably from 0.5 mg to 10 mg, iron-containing bleach catalyst. The composition may comprise from 0.1 mg to 20 mg, preferably from 0.5 mg to 10 mg, manganese-containing bleach catalyst.

Builder System

The composition may comprise from 1.0 g to 10 g builder system.

The builder system typically comprises detergent ingredients that are complexing agents. Suitable builder complexing agents are capable of sequestering hardness cations, especially calcium cations and/or magnesium cations.

Typically, the builder system controls the hardness of the wash liquor, which in turn aids the cleaning performance and soil suspension performance of the composition. The builder system can also extract calcium and magnesium cations from the soil, which also improves the cleaning performance of the composition.

Any suitable builder complexing agent can be used. Suitable builder complexing agents may also be able to complex other cations, such as transition metal cations.

A preferred builder complexing agent is selected from aminopolycarboxylic acids and/or salts thereof, carboxylic acids and/or salts thereof, and any combination thereof.

Suitable aminopolycarboxylic acids and/or salts thereof are selected from methylglycine-N,N-diacetic acid and/or salts thereof (MGDA), glutamic acid diacetic acid and/or salts thereof (GLDA), iminodisuccinic acid and/or salts thereof (IDS); hydroxyethyleiminodiacetic acid and/or salts thereof (HEIDA), and any combination thereof, preferably methylglycine-N,N-diacetic acid and/or salts thereof (MGDA) and/or glutamic acid diacetic acid and/or salts thereof (GLDA), most preferably methylglycine-N,N-diacetic acid and/or salts thereof (MGDA). A suitable builder complexing agent is the tri-sodium salt of methylglycine-N,N-diacetic acid.

A suitable aminopolycarboxylic acid and/or salts thereof is ethylene diamine disuccinic acid and/or salts thereof (EDDS).

Suitable carboxylic acids and/or salts thereof can be dicarboxylic acids and/or salts thereof, such as glucaric acid and/or salts thereof, itaconic acid and/or salts thereof, maleic acid and/or salts thereof, succinic acid and/or salts thereof, tartaric acid and/or salts thereof, and any combination thereof.

Suitable carboxylic acids and/or salts thereof can be tricarboxylic acids and/or salts thereof, A suitable carboxylic acid and/or salts thereof is citric acid and/or salts thereof. A suitable builder complexing agent is sodium citrate.

The composition may comprise a builder complexing agent selected from methylglycine-N,N-diacetic acid and/or salts thereof (MGDA) and/or citric acid and/or salts thereof. The composition may comprise the combination of methylglycine-N,N-diacetic acid and/or salts thereof (MGDA) and/or citric acid and/or salts thereof.

The composition may comprise from 1.0 g to 10 g methylglycine-N,N-diacetic acid and/or salts thereof (MGDA). Any suitable methylglycine-N,N-diacetic acid and/or salt thereof (MGDA) can be used. Preferably, the MGDA is the salt form of methylglycine-N,N-diacetic acid, more preferably the MGDA is the tri-sodium salt of methylglycine-N,N-diacetic acid.

The composition may comprise from 1.0 g to 10 g citric acid and/or salts thereof.

Chelant System

The composition may comprise from 0.1 g to 5.0 g chelant system.

The chelant system typically comprising chelating agents. Suitable chelating agents can chelate transition metal cations, especially copper, iron and zinc.

Typically, the chelant system stabilizes the bleaching system by protecting the bleach from transition metal cation degradation. The chelant system can also extract transition metal cations from soils, such as tea soils.

Any suitable chelating agent can be used. Suitable chelating agents may also be able to complex other cations, such as hardness cations like calcium and magnesium.

Suitable chelating agents are selected from phosphonic acids and/or salts thereof. Phosphonic acids and/or salts thereof typically provide crystal growth inhibition performance.

A preferred phosphonic acid and/or salts thereof is selected from: 1-hydroxy ethylidene-1,1 diphosphonic acid and/or salts thereof (HEDP), amino trimethyl phosphonic acid and/or salts thereof (ATMP), diethylene triamine pentamethylene phosphonic acid and/or salts thereof (DTMP), 2-phosphono 1,2,4-butane tricarboxylic acid and/or salts thereof (PBTC), and any combination thereof, preferably 1-hydroxy ethylidene-1,1 diphosphonic acid and/or salts thereof (HEDP). A suitable chelating agent is the tetrasodium salt of 1-hydroxy ethylidene-1,1 diphosphonic acid.

The composition may comprise from 0.1 g to 5.0 g chelating agent. The composition may comprise from 0.1 g to 1.5 g 1-hydroxy ethylidene-1,1 diphosphonic acid and/or salts thereof (HEDP).

Enzyme System.

The composition may comprise from 1.0 g to 400 mg enzyme system.

The enzyme system provides cleaning benefits.

The enzyme typically comprises an enzyme selected from amylase, cellulase, lipase, protease and any combination thereof. Preferably, the enzyme system comprises an amylase and/or a protease.

The composition typically comprises, on an active enzyme basis, from 1.0 mg to 300 mg of each enzyme type included in the composition.

The composition may comprise, on an active enzyme basis, from 10.0 mg to 300 mg protease and from 2.0 mg to 30 mg amylase.

Suitable enzymes can be in the form of granulates. Suitable enzyme granulates comprise less than 29 wt. % of sodium sulphate. Suitable granulates comprise sodium sulphate in an amount such that the weight ratio of the sodium sulphate and enzyme (on an active enzyme basis) is less than 4:1.

In describing enzymes, the following nomenclature is used for ease of reference: Original amino acid(s):position (s):substituted amino acid(s). Standard enzyme IUPAC 1-letter codes for amino acids are used.

Amylase

Suitable amylases include alpha-amylases. Suitable amylases are from bacterial or fungal origin.

A preferred alkaline alpha-amylase is derived from a strain of *Bacillus*, such as *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512 or NCIB 12513.

Suitable commercially available alpha-amylases include: KEMZYM® (AT 9000 Biozym Biotech Trading GmbH Wehlistrasse 27b A-1200 Wien Austria); ENZYSIZE®, OPTISIZE HT PLUS®, PURASTAR®, PURASTAR OXAM®, and RAPIDASE®, (Genencor International Inc., Palo Alto, California); KAM® (Kao, 14-10 Nihonbashi Kayabacho, 1-chome, Chuo-ku Tokyo 103-8210, Japan); BAN®, DURAMYL®, FUNGAMYL®, LIQUEZYME®, NATALASE®, POWERASE®, STAINZYME®, STAINZYME PLUS®, SUPRAMYL®, TERMAMYL®, and TERMAMYL ULTRA® (Novozymes A/S, Bagsvaerd, Denmark); and any combination thereof.

Preferred amylases include NATALASE®, POWERASE®, STAINZYME®, STAINZYME PLUS®, and any combination thereof.

Cellulase

Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Fusarium oxysporum*, and *Myceliophthora thermophila.*

Commercially available cellulases include: Biotouch® series of enzymes (AB Enzymes); Revitalenz® series of enzymes (Du Pont); Carezyme®, Carezyme® Premium, Celluclean®, Celluzyme® and Whitezyme® (Novozymes A/S); and any combination thereof.

Suitable commercially available cellulases include Celluclean® Classic and/or Carezyme® Premium.

Lipase

Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

A suitable lipase is a variant of the wild-type lipase from *Thermomyces lanuginosus*, preferably comprising T231R and/or N233R mutations. Preferred lipases include those sold under the tradenames Lipex®, Lipoclean®, and Lipolex® by Novozymes, Bagsvaerd, Denmark.

Other suitable lipases include Liprl 139 and/or TfuLip2.

Protease

Suitable proteases include metalloproteases and serine proteases. Suitable proteases include neutral or alkaline microbial serine proteases, such as subtilisins, as well as chemically or genetically modified variants thereof.

Suitable proteases include proteases derived from *Bacillus*. Suitable proteases include variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

Suitable commercially available protease enzymes include those sold under the trade names Savinase®, Polarzyme®, Kannase®, Ovozyme®, Everlase® and Esperase® by Novozymes A/S (Denmark), those sold under the tradename Properase®, Purafect®, Purafect Prime®, Purafect Ox®, FN3®, FN4®, Excellase®, Ultimase® and Purafect OXP® by Genencor International, those sold under the tradename Opticlean® and Optimase® by Solvay Enzymes, those available from Henkel/Kemira, namely BLAP, and any combination thereof.

Other Enzymes

Other suitable enzymes are bleaching enzymes. Preferred bleaching enzymes are peroxidases/oxidases. Typical bleaching enzymes include those of plant, bacterial or fungal origin, and variants thereof. Commercially available peroxidases include Guardzyme® (Novozymes A/S).

Other suitable bleaching enzymes include choline oxidases and/or perhydrolases.

Suitable enzymes include sugar degrading enzymes. Suitable enzymes include glycosyl hydrolase. A suitable enzyme is selected from glucanase, hemicellulase, mannanase, xylanase, and any combination thereof.

Suitable mannanases are sold under the tradenames Mannastar® (Du Pont) and Mannaway® (Novozymes A/S, Bagsvaerd, Denmark).

Suitable enzymes include pectate lyases. Suitable pectate lyases are sold under the tradenames PrimaGreen® (DuPont) and X-Pect®, Pectaway® (from Novozymes A/S, Bagsvaerd, Denmark).

A suitable enzyme is phospholipase.

Polymer System.

The composition may comprise from 0.1 g to 5.0 g, or from 0.5 g to 2.0 g polymer system.

The polymer system can act as soil dispersant as well, as a co-builder to help complex hardness cations such as calcium and magnesium.

The polymer system typically comprises polymers. Suitable polymers are selected from modified polyamine polymers, modified polysaccharide polymers, polyalkylene oxide polymers, polycarboxylate polymers, silicone polymers, terephthalate polymers, other polyester polymers, and any combination thereof.

Preferably, the polymer system comprises polymers selected from polyamine polymers, modified polysaccharide polymers, polyalkylene oxide polymers, polycarboxylate polymers, and any combination thereof, most preferably, polycarboxylate polymers.

The composition may comprise from 0.1 g to 5.0 g, or from 0.5 g to 2.0 g polycarboxylate polymers.

Modified Polyamine Polymers

Suitable modified polyamine polymers comprise a polyamine core structure and a plurality of alkoxylate groups attached to the core structure. The polyamine core structure includes polyalkyleneimine, and linear or branched oligoamine.

The polyamine core structure and the alkoxylate groups attached to the core structure can be further derivatized. For example, the polyamine core structure can be further partly or completely quaternized with $C_1$-$C_{30}$ linear or branched alkyl, more preferably $C_1$-$C_{10}$ or even $C_1$-$C_5$ linear or branched alkyl, most preferably methyl. The alkoxylate group can be further sulphated, sulphonated and/or substituted with an amino functional group.

Suitable modified polyamine dispersing agent includes ethoxylated polyethyleneimine (EPEI). EPEI are effective dispersing agent for hydrophilic stains, especially hydrophilic particulate stain such as clay.

Preferably, the EPEI comprises a polyethyleneimine backbone having weight average molecular weight of between 100 g/mol and 2000 g/mol, preferably between 200 g/mol and 1500 g/mol, more preferably between 300 g/mol and 1000 g/mol, even more preferably between 400 g/mol and 800 g/mol, most preferably between 500 g/mol and 700 g/mol, preferably about 600. The ethoxylation chains within the EPEI may be from 200 g/mol to 2000 g/mol weight average molecular weight, preferably from 400 g/mol to 1500 g/mol weight average molecular weight, more preferably from 600 g/mol to 1000 g/mol weight average molecular weight, most preferably about 880 g/mol weight average molecular weight per ethoxylated chain. The ethoxylation chains within the EPEI have on average 5 to 40, preferably 10 to 30, more preferably 15 to 25, even more preferably 18 to 22, most preferably about 20 ethoxy units per ethoxylation chain. The EPEI may have a total weight average molecular weight of from 5000 g/mol to 20000 g/mol, preferably from 7500 g/mol to 17500 g/mol, more preferably from 10000 g/mol to 15000 g/mol, even more preferably from 12000 g/mol to 13000 g/mol, most preferably about 12700 g/mol. A preferred example is polyethyleneimine core (with average molecular weight about 600 g/mol) ethoxylated to 20 EO groups per NH. Suitable EPEI this type includes Sokalan HP20 available from BASF, Lutensol FP620 from BASF. Examples of available polyethyleneimine ethoxylates also include those prepared by reacting ethylene oxide with Epomine SP-006 manufactured by Nippon Shokubai.

The EPEI may comprise polyethyleneimine having an average molecular weight (Mw) ranging from 1800 to 5000 g/mol (prior to ethoxylation), and the polyoxyethylene side chains may have an average of from 25 to 40 ethoxy units per side chain bonded to the polyethyleneimine backbone.

Suitable modified polyamine polymers include amphiphilic alkoxylated polyalkyleneimine polymer. These polymers have balanced hydrophilic and hydrophobic properties such that they remove grease and body soil particles from surfaces, and keep the particles suspended in washing liquor. Suitable amphiphilic water-soluble alkoxylated polyalkyleneimine polymers comprise polyalkyleneimine core, preferable polyethyleneimine core, and alkoxylate group connected to the core. Suitable alkoxylate groups have the structure:

$$*\text{-}[A^2\text{-}O]_m\text{—}[CH_2\text{—}CH_2\text{—}O]_n\text{-}[A^3\text{-}O]_p\text{—}R \qquad (V)$$

wherein:

"*" in each case denotes one-half of bond to the nitrogen atom of the core.

$A^2$ is in each case independently selected from 1,2-propylene, 1,2-butylene, and 1,2-isobutylene.

$A^3$ is 1,2-propylene.

R is in each case independently selected from hydrogen and $C_1$-$C_4$-alkyl, preferably hydrogen.

m has an average value in the range of from 0 to 2, preferably 0.

n has an average value in the range of 5 to 50.

p has an average value in the range of 3 to 50.

Suitable alkoxylated polyalkyleneimine polymers have a degree of quaterization ranging from 0 to 50, preferably from 0 to 20, and more preferably from 0 to 10.

A preferred alkoxylated polyalkyleneimine polymer is polyethyleneimine (MW=600) modified with 24 ethoxylate groups per —NH and 16 propoxylate groups per —NH. Another preferred alkoxylated polyalkyleneimine polymer is polyethyleneimine (MW=600) modified with 10 ethoxylate groups per —NH and 7 propoxylate groups per —NH.

Suitable alkoxylated polyalkyleneimine polymers include Sokalan HP30 Booster available from BASF.

Suitable modified polyamine polymers includes zwitterionic polyamines. Suitable zwitterionic polyamines have the structure:

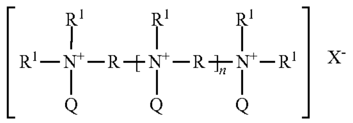

wherein:

R is each independently $C_3$-$C_{20}$ linear or branched alkylene.

$R^1$ is an anionic unit-capped polyalkyleneoxy unit having the formula: $—(R^2O)_xR^3$.

$R^2$ is $C_2$-$C_4$ linear or branched alkylene, preferably $C_2$ (ethylene).

$R^3$ is hydrogen, an anionic unit, and mixtures thereof, in which not all $R^3$ groups are hydrogen, preferably wherein $R^3$ anionic units are selected from $—(CH_2)_pCO_2M$; $—(CH_2)_qSO_3M$; $—(CH_2)_qOSO_3M$; $—(CH_2)_qCH(SO_3M)\text{-}CH_2SO_3M$; $—(CH_2)_qCH(OSO_3M)CH_2OSO3M$; $—(CH_2)_qCH(SO_3M)CH_2SO_3M$; $—(CH_2)_pPO_3M$; $—PO_3M$; $—SO_3M$ and mixtures thereof; wherein M is hydrogen or a water soluble cation, preferably selected from sodium, potassium, ammonium, and mixtures thereof and in sufficient amount to satisfy charge balance.

x is from 5 to 50, preferably from 10 to 40, even more preferably from 15 to 30, most preferably from 20 to 25.

Q is a quaternizing unit selected from the group consisting of $C_1$-$C_{30}$ linear or branched alkyl, $C_6$-$C_{30}$ cycloalkyl, $C_7$-$C_{30}$ substituted or unsubstituted alkylenearyl, and mixtures thereof, preferably $C_1$-$C_{30}$ linear or branched alkyl, even more preferably $C_1$-$C_{10}$ or even $C_1$-$C_5$ linear or branched alkyl, most preferably methyl; the degree of quaternization preferably is more than 50%, more preferably more than 70%, even more preferably more than 90%, most preferably about 100.

$X^-$ is an anion present in sufficient amount to provide electronic neutrality, preferably a water-soluble anion selected from the group consisting of chlorine, bromine, iodine, methylsulfate, and mixtures thereof, more preferably chloride.

n is from 0 to 8, preferably 0 to 4, preferably 0 to 2, most preferably 0.

A suitable zwitterionic polyamine having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof.

A particular preferred zwitterionic polyamine is available from BASF as Lutensit Z96 polymer (zwitterionic hexamethylene diamine according to below formula: 100% quaternized and about 40% of the polyethoxy ($EO_{24}$) groups are sulfonated).

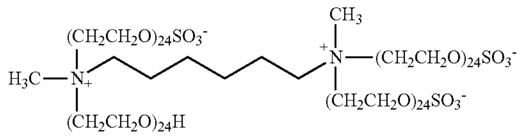

Another suitable zwitterionic polyamine is amphoterically-modified oligopropyleneimine ethoxylates.

Modified Polysaccharide Polymers

Various polysaccharides can be useful as starting material for chemical modification to make modified polysaccharide polymers, including cellulose, starch, guar, dextran, polyglucan, chitin, curdlan, xylose, inulin, pullulan, locust bean gum, cassia gum, tamarind gum (xyloglucan), xanthan gum, amylose, amylopectin, scleroglucan and any combination thereof.

The most common type of modified polysaccharide is modified cellulose.

Modified cellulose polymers include anionic modified cellulose polymers which been modified with functional groups that contain negative charge. Suitable anionic modified cellulose polymers include carboxyalkyl cellulose, such as carboxymethyl cellulose. The carboxymethyl cellulose may have a degree of carboxymethyl substitution of from about 0.5 to about 0.9, and a molecular weight from about 80,000 Da to about 300,000 Da. Suitable carboxymethylcellulose include Finnfix® series sold by CP Kelco or Nouryon, which include Finnfix® GDA, a hydrophobically modified carboxymethylcellulose, e.g., the alkyl ketene dimer derivative of carboxymethylcellulose sold under the tradename Finnfix® SH1, or the blocky carboxymethylcellulose sold under the tradename Finnfix®V. Other suitable anionic modified cellulose polymers include sulphoalkyl cellulose and sulfoethyl cellulose.

Modified cellulose polymers also include nonionic modified cellulose polymers which have been modified by a functional group that does not contain any charge. Suitable nonionic modified cellulose polymers include alkyl cellulose, hydroxyalkyl cellulose, hydroxyalkyl alkylcellulose, alkylalkoxyalkyl cellulose. Suitable nonionic modified cellulose polymers also include nonionic cellulose carbamates, and nonionic 6-desoxy-6-amino-celluloses derivative. Examples of alkyl cellulose include methyl cellulose (MC), ethyl cellulose (EC), etc. Suitable ethyl celluloses are sold under tradename Ethocel™ by Dow Chemicals, DuPont, or IFF. Examples of hydroxyalkyl celluloses include hydroxyethyl cellulose (HEC) and hydroxypropyl cellulose (HPC). Suitable HECs are sold under tradename Natrosol™ hydroxyethylcellulose by Ashland, such as Natrosol™ 250 with different grades available which have a total molar substitution (MS) of 2.5. Suitable HECs are also sold under tradename CELLOSIZE™ Hydroxyethyl Cellulose by Dow Chemicals. Suitable HPCs are sold under tradename Klucel™ by Ashland. Example of hydroxyalkyl alkylcellulose include hydroxypropyl methylcellulose (HPMC), suitable HPMC are sold under tradename Methocel™ with different grades available by Dow Chemicals, DuPont or IFF, and under tradename Benecel™ by Ashland.

Modified cellulose polymers also include cationic modified cellulose polymers which been modified by functional group that contain cationic charge. Suitable cationic modified celluloses include quaternized hydroxyethyl cellulose (Polyquaternium-10), which is available under the tradename of Ucare by Dow Chemical, such as Ucare LR400, Ucare LR30M, Ucare JR125, Ucare JR400, etc. Suitable cationic modified cellulose polymers also include quaternized hydroxyethyl cellulose (HEC) polymers with cationic substitution of trimethyl ammonium and dimethyldodecyl ammonium (Polyquaternium-67), which are available under the tradename SoftCAT by Dow Chemical, such as SoftCAT SK, SoftCAT SK-MH, SoftCAT SX, SoftCAT SL. Other suitable cationic modified celluloses include those sold under tradename SupraCare™ by Dow Chemical, such as SupraCare™ 150, SupraCare™ 133, SupraCare™ 212. Suitable cationic modified cellulose polymers also include those modified with cationic group and a hydrophobic group.

Another suitable type of modified polysaccharide is modified guar. The modified guar can be nonionic modified, anionic modified, and/or cationic modified. Suitable nonionic modified guar includes hydroxypropyl guar, such as N-Hance™ HP40 and HP40S guar available from Ashland. Suitable example of modified guar also include carboxymethyl hydroxypropyl guar (CMHPG) which is anionic and nonionic modified, such as Galactasol™ available from Ashland. Suitable modified guar also includes cationic modified guar, such as guar hydroxypropyltrimonium chloride, which is available from by Ashland as AquaCat™ CG518 cationic solution, AquaCat™ PF618 cationic solution, N-Hance™ 3000, 3196, 3215, BF-13, BF-17, C261, C261N, CG13, CCG45. Other cationic modified guar polymers are available from Solvay as Jaguar® C 162, Excel, Excel SGI, Optima, C 13 S, C 13 SH, C14 S, C-17, LS SGI, C-500 STD. Other nonionic and/or anionic modified guar include for example Jaguar® HP 105 (Hydroxypropyl Guar gum), Jaguar® SOFT and HP-120 COS (Carboxymethyl Hydroxypropyl Guar Gum).

Suitable modified polysaccharide polymers also include modified starch. Examples of modified starch include carboxylate ester of starch, esterification product of starch with e.g., $C_6$-$C_{24}$ alk(en)yl succinic anhydride; and starch maleates (starch react with maleic acid anhydride). Examples of modified starch also include, but not limit to, acetylated starch, acetylated distarch adipate, distarch phosphate, hydroxypropyl starch, hydroxy propyl distarch phosphate, phosphated distarch ohosphate, acetylated distarch phosphate, starch sodium octenyl succinate.

Suitable modified polysaccharide polymers also include polymers based on other polysaccharide, such as cationic dextran polymers, the cationic dextran polymers are commercially available under brand name CDC, CDC-L, CDC-H by Meito Sangyo.

Suitable modified polysaccharide polymers also include polymers based on polyglucans. Suitable modified polyglucans are based on alpha 1,3-polyglucans and/or 1,6-polyglucans. Preferably, the modified polyglucans can be cationic modified, such as cationic modified alpha 1,3-polyglucan, such as cationic modified alpha 1,6-polyglucans. Another class of preferred modified polyglucans can be hydrophobic and/or hydrophilic modified. Polyglucan esters are especially preferred due to their performance and biodegradability profiles.

Other suitable polysaccharide polymers include those based on inulin. Example of modified inulin include carboxymethyl group modified inulin (CMI), suitable CMI are Carboxyline series sold by Cosun Beet Company, including Carboxyline 25-40D, Carboxyline 25 D Powder, Carboxyline 20 LS D Powder, Carboxyline 25, Carboxyline 25-30 UP. Example of modified inulin also include cationic modified inulin, suitable cationic modified inulins include the Quatin series sold by Cosun Beet Company, including Quatin 350, Quatin 380 and Quatin 1280 which are characterized by different degree of substitution (DS), cationic density (meq/g) and molecular weight (g/mol).

Suitable modified polysaccharide polymers also include polymers based on other polysaccharide, such as xylose carbamates, carboxy or sulfo-alkylated pullulan, carboxy- or sulfo-alkylated chitosan, and any combination thereof.

Polyalkylene Oxide Polymers

Suitable polyalkylene oxide polymers include poly (ethylene oxide). Preferably the poly (ethylene oxide) has a molecular weight from 1000 to 10000, more preferably from 2000 to 9000, more preferably from 3000 to 8500, most preferably from 4000 to 8000 such as 5000, 6000, 7000.

Suitable polyalkylene oxide polymers include graft polymers. Suitable graft polymers can be based on polyalkylene oxide Suitable polymers comprise polyalkylene oxide backbone (A) as a graft base and polymeric sidechains (B) grafted thereon. The polymeric sidechains (B) are obtainable by polymerization of at least one vinyl ester monomer. The polyalkylene oxide backbone (A) is obtainable by polymerization of at least one monomers selected from the group of ethylene oxide, 1,2-propylene oxide, 1,2-butylene oxide, 2,3-butylene oxide, 1,2-pentene oxide or 2,3-pentene oxide. Such graft polymers are known as effective soil suspension polymers for hydrophobic and hydrophilic stains, surfactant boosters, and sometimes as dye transfer inhibitors.

Suitable graft polymers include amphiphilic graft copolymer comprising polyethylene glycol backbone (A) as a graft base, and at least one pendant sidechains (B) selected from polyvinyl acetate, polyvinyl alcohol and mixtures thereof. A preferred graft polymer of this type is Sokalan HP22 available from BASF.

Suitable graft polymers are amphiphilic graft polymers based on water-soluble polyalkylene oxides (A) as a graft base and side chains formed by polymerization of a vinyl ester component (B), said polymers typically having an average of <one graft site per 50 alkylene oxide units and mean molar masses M typically of from 3000 to 100000. One specific preferred graft polymer of this type is polyvinyl acetate grafted polyethylene oxide copolymer having a polyethylene oxide as graft base and multiple polyvinyl acetate side chains. The molecular weight of the polyethylene oxide backbone is typically about 6000 and the weight ratio of the polyethylene oxide to polyvinyl acetate is typically about 40 to 60 and typically no more than 1 grafting point per 50 ethylene oxide units. The most preferred polymer of this type is available from BASF as Sokalan PG101.

Suitable graft polymers include graft polymers comprising a block copolymer backbone (A) as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x is typically from 2 to 10 and preferably 3 to 5, and (B) polymeric sidechains grafted onto the block copolymer backbone, wherein said polymeric sidechains (B) are obtainable by polymerization of at least one vinyl ester monomer. These polymers have improved biodegradation profiles.

Suitable graft polymers include graft polymers comprising a polyalkylene oxide backbone (A) which has a number average molecular weight of from about 1000 to about 20,000 Daltons and is based on ethylene oxide, propylene oxide, or butylene oxide; and side chains derived from N-vinylpyrrolidone (B), and side chains derived from vinyl ester (C) derived from a saturated monocarboxylic acid containing from 1 to 6 carbon atoms and/or a methyl or ethyl ester of acrylic or methacrylic acid.

Polycarboxylate Polymers

Polycarboxylate polymers typically comprise at least one carboxy group-containing monomer. The carboxy group-containing monomers are typically selected from acrylic acid, methacrylic acid, fumaric acid, maleic acid, itaconic acid, aconitic acid, mesaconic acid, citraconic acid, methylenemalonic acid, salts thereof, anhydrides thereof, and any combination thereof.

Suitable polycarboxylate polymers include polyacrylate homopolymer having a molecular weight of from 4,000 Da to 9,000 Da, or from 6,000 Da to 9,000 Da. Other suitable carboxylate polymers include copolymers of acrylic acid (and/or methacrylic acid) and maleic acid having a molecular weight of from 50,000 Da to 120,000 Da, or from 60,000 Da to 80,000 Da. The polyacrylate homopolymer and copolymer of acrylic acid (and/or methacrylic acid) and maleic acid are commercially available as Acusol 445 and 445N, Acusol 531, Acusol 463, Acusol 448, Acusol 460, Acusol 465, Acusol 497, Acusol 490 from Dow Chemicals, and as Sokalan CP 5, Sokalan CP 7, Sokalan CP 45, and Sokalan CP 12S from BASF.

Suitable polycarboxylate polymers also include polyitaconate homopolymers, such as Itaconix® DSP 2K™ sold by Itaconix, and Amaze SP available from Nouryon.

Suitable polycarboxylate polymers also include co-polymers comprising carboxy group-containing monomers and one or more sulfonate or sulfonic group-containing monomers. The sulfonate or sulfonic group containing monomers are typically selected from 2-acrylamido-2-methyl-1-propanesulfonic acid (AMPS), 2-methacrylamido-2-methyl-1-propanesulfonic acid, 3-methacrylamido-2-hydroxy-propanesulfonic acid, allysulfonic acid, methallysulfonic acid, 3-allyloxy-2-hydroxy-1-propanesulfonic acid, 2-methyl-2-propenen-1-sulfonic acid, styrenesulfonic acid, vinylsulfonic acid, 3-sulfopropyl acrylate, 3-sulfopropylmethacrylate, sulfomethylacrylamide, sulfomethylmethacrylamide and water soluble salts thereof.

Suitable polymers may comprise maleic acid, acrylic acid, and 3-allyloxy-2-hydroxy-1-propanesulfonic acid. Suitable polymers may comprise acrylic acid and 2-acrylamido-2-methyl-propane sulfonate, such as those sold under tradename Acusol 588 by Dow Chemicals, Sokalan CP50 by BASF, Aquatreat AR-545, Versaflex 310 and Versaflex 310-37 by Nouryon.

Suitable polymers include poly(itaconic acid-co-AMPS) sodium salt, such as Itaconix® TSI™ 322 and Itaconix® CHT™ 122 available from Itaconix.

Suitable polymers also includes those comprising other structure units in addition to the sulfonate or sulfonic group group-containing monomers and carboxy group-containing monomers. Suitable additional monomers are ether bond-containing monomers represented by formula (1) and (2) below:

(1)

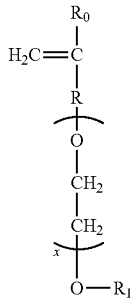

(2)

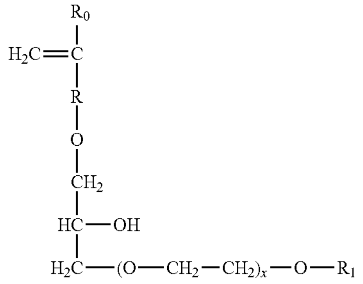

wherein in Formula (1):

$R_0$ represents a hydrogen atom or $CH_3$ group.

R represents a $CH_2$ group, $CH_2CH_2$ group or single bond.

x represents a number 0-50, preferably 0-20, more preferably 0-5 (provided x represents a number 1-5 when R is a single bond).

$R_1$ is a hydrogen atom or $C_1$ to $C_{20}$ organic group.

wherein in Formula (2):

$R_0$ represents a hydrogen atom or $CH_3$ group.

R represents a $CH_2$ group, $CH_2CH_2$ group or single bond.

x represents a number 0-5.

$R_1$ is a hydrogen atom or $C_1$ to $C_{20}$ organic group.

A specific preferred polymer comprises structure units derived from 1 to 49 wt. % of 1-(allyloxy)-3-butoxypropan-2-ol, from 50 to 98 wt. % acrylic acid or methacrylic acid, and from 1 to 49 wt. % of 3-allyloxy-2-hydroxy-1-propanesulfonic acid, and the has a weight average molecular weight of from about 20,000 to about 60,000. a specific preferred polymer of this type comprises structure units derived from 1 to 10 wt. % of 1-(allyloxy)-3-butoxypropan-2-ol, from 70 to 89 wt. % acrylic acid or methacrylic acid, and from 10 to 20 wt. % of 3-allyloxy-2-hydroxy-1-propanesulfonic acid, and the has a weight average molecular weight of from about 30,000 to about 60,000. Herein, 1-(allyloxy)-3-butoxypropan-2-ol is a preferred monomer as represented by formula (2) when $R_0$ is H, R is $CH_2$, x is 0, and $R_1$ is n-butyl ($C_4$-alkyl).

Suitable polycarboxylate polymers also include co-polymers comprising carboxy group-containing monomers and other suitable monomers. Other suitable monomers are selected from esters and/or amide of the carboxy group-containing monomers, such as $C_1$-$C_{20}$ alkyl ester of acrylic acid; alkylene; vinyl ethers, such as methyl vinyl ether, styrene and any mixtures thereof. One specific preferred polymer family of this type is sold under tradename Gantrez by Ashland, which includes Gantrez An (alternating co-polymer of methyl vinyl ether and maleic anhydride), Gantrez S (alternating co-polymer of methyl vinyl ether and maleic acid), Gantrez ES (alternating co-polymer of methyl vinyl ether and maleic acid ester), Gantrez MS (alternating co-polymer of methyl vinyl ether and maleic acid salt).

Suitable polycarboxylate polymers also include polyepoxy succinic acid polymers (PESA). A most preferred polyepoxy succinic acid polymer can be identified using CAS number: 51274-37-4, or 109578-44-1. Suitable polyepoxy succinic acid polymers are commercially available from various suppliers, such as Aquapharm Chemicals Pvt. Ltd (commercial name: Maxinol 600); Shandong Taihe Water Treatment Technologies Co., Ltd (commercial name: PESA), and Sirius International (commercial name: Briteframe PESA).

Suitable polycarboxylate polymers may comprise a monomer having at least one aspartic acid group or a salt thereof, this polymer comprises at least 25 mol %, 40 mol %, or 50 mol %, of said monomer. A preferabed example is sodium salt of poly(aspartic acid) having a molecular weight of from 2000 to 3000 g/mol which is available as Baypure® DS 100 from Lanxess. Suitable polyaspartates can be further modified.

Terephthalate Polymers

Suitable terephthalate polymers are terephthalate-derived polyester polymers, which comprise structure unit (I) and/or (II):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

wherein:

a, b are from 1 to 200.

d, e are from 1 to 50.

Ar is independently selected from 1,4-substituted phenylene, and 1,3-substituted phenylene.

sAr is 1,3-substituted phenylene substituted in position 5 with $—SO_3M$; wherein M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof.

$R^1$, $R^2$, $R^3$, $R^4$ are independently selected from H or $C_1$-$C_{18}$ n-alkyl or iso-alkyl; preferably selected from H or $C_1$ alkyl.

Optionally, the polymer may further comprises one or more terminal group (III) derived from polyalkylene glycolmonoalkylethers, preferably selected from structure (IV-a)

$$—O—[C_2H_4—O]_c—[C_3H_6—O]_d—[C_4H_8—O]_e—R_7 \quad (IV\text{-}a)$$

wherein:

$R_7$ is a linear or branched $C_{1\text{-}30}$ alkyl, $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; preferably $C_{1\text{-}4}$ alkyl, more preferably methyl.

c, d and e are, based on molar average, a number independently selected from 0 to 200, where the sum of c+d+e is from 2 to 500.

wherein the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, either of the $[C_2H_4—O]$, $[C_3H_6—O]$ and $[C_4H_8—O]$ groups of the terminal group (IV-a) can be linked to $—R_7$ and/or —O. Preferably, $[C_3H_6—O]$ group is linked to —O, and the —O is further connected to —OC—Ar—CO— or —OC-sAr—CO—.

Optionally, the polymer may further comprise one or more anionic terminal unit (IV) and/or (V) as described in EP3222647. Where M is a counterion selected from $Na^+$, $Li^+$, $K^+$, ½ $Mg^{2+}$, ½ $Ca^{2+}$, ⅓ $Al^{3+}$, ammonium, mono-, di-, tri-, or tetraalkylammonium wherein the alkyl groups are $C_1$-$C_{18}$ alkyl or $C_2$-$C_{10}$ hydroxyalkyl, or mixtures thereof.

$$—O—CH_2CH_2—SO_3M \quad (IV)$$

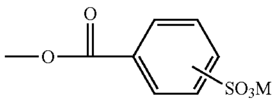

(V)

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, other di- or polycarboxylic acids or their salts or their (di)alkylesters can be used in the polyesters, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their ($C_1$-$C_4$)-(di)alkyl esters and more preferably their (di)methyl esters, or mixtures thereof.

One type of preferred polyester polymers are nonionic polyester polymers which do not comprise the above structure unit (II). A particular preferred nonionic terephthalate-derived polymer has a structure according to formula below:

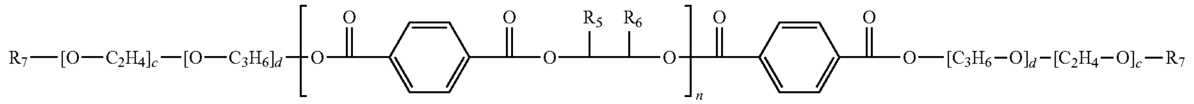

wherein:

$R_5$ and $R_6$ are independently selected from H or $CH_3$. More preferably, one of the $R_5$ and $R_6$ is H, and another is $CH_3$.

c, d are, based on molar average, a number independently selected from 0 to 200, where the sum of c+d is from 2 to 400.

More preferably, d is from 0 to 50, c is from 1 to 200.

More preferably, d is 1 to 10, c is 5 to 150.

$R_7$ is $C_1$-$C_4$ alkyl and more preferably methyl.

N is, based on molar average, from 1 to 50.

One example of most preferred above suitable terephthalate-derived nonionic polymers has one of the $R_5$ and $R_6$ is H, and another is $CH_3$; d is 0; c is from 5-100 and $R_7$ is methyl, and n is from 3-10.

Other suitable terephthalate-derived polyester polymers can be end capped. The end capping group of these SRPs are typically selected from:

$$X—(OC_2H_4)_n—(OC_3H_6)_m—$$

wherein, X is $C_1$-$C_4$ alkyl and preferably methyl, the $—(OC_2H_4)$ groups and the $—(OC_3H_6)$ groups are arranged blockwise and the block consisting of the $—(OC_3H_6)$ groups is bound to a COO group, n is based on a molar average a number of from 40 to 50, m is based on a molar average a number of from 1 to 10 and preferably of from 1 to 7.

The polyester may or may not be biodegradable, preferred soil release polymers are readily biodegradable.

Example of suitable polyesters include TexCare® series supplied by Clariant, including nonionic polymers Texcare® SRN 100, SRN 170, SRN 170 C, SRN 170 Terra, SRN 172, SRN 240, SRN 260, SRN 260 life, SRN 260 SG Terra, SRN UL50, SRN 300, SRN 325; and anionic polymers TexCare® SRA 100, SRA 300, SRA300 F. Example of suitable polymers also include REPEL-O-TEX® line of polymers supplied by Rhodia/Solvay, including the nonionic polymer REPEL-O-TEX® Crystal, Crystal PLUS, Crystal NAT, SRP6; and the anionic polymer REPEL-O-TEX® SF-2. Other examples of polymers includes the WeylClean® series of polymers supplied by WeylChem, including nonionic polymers WeylClean® PLN1, PLN2; and anionic polymers WeylClean® PSA1. Other examples of polymers are Marloquest® polymers, such as Marloquest® SL, HSCB, L235M, U, B, and G82, supplied by Sasol. Suitable polymers include Sorez 100 (from ISP or Ashland).

Other Polyester Polymers

Suitable other polyester polymers include polyester soil release polymers derived from bio-based 2,5-furandicarboxylic acid and derivatives thereof.

Surfactant System

Typically, the surfactant system provides cleaning benefits, shine benefits, water drainage and drying benefits. The surfactant system can act to remove soil and suspend soil.

The composition may comprise from 0.5 g to 5.0 g, or from 0.6 g to 4.0 g, or from 0.7 g to 3.0 g surfactant system.

The surfactant system can comprise amphoteric surfactant, anionic surfactant, cationic surfactant, nonionic surfactant, zwitterionic surfactant, and any combination thereof. Most preferably, the surfactant system comprises nonionic surfactant.

The surfactant system typically comprises a surfactant, typically one or more, preferably two or more, or three or more, or four or more, or even five or more different types of surfactants, and preferably from 2 to 8, or 3 to 7, or 4 to 6 different types of surfactants.

The surfactant system may have a phase inversion temperature, as measured at a concentration of 1 wt. % in distilled water, between 20° C. and 70° C., preferably between 35° C. and 65° C. Phase inversion temperature is the temperature below which a surfactant system partitions preferentially into the water phase (typically as oil-swollen micelles), and above which the surfactant system partitions preferentially into the oil phase (typically as water swollen inverted micelles). Phase inversion temperature can be determined visually by identifying at which temperature cloudiness occurs. The phase inversion temperature of the surfactant system can be determined as follows: a solution containing 1 wt. % of the surfactant system, by weight of the solution in distilled water, is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Preferably, the surfactant system comprises a surfactant selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

Suitable surfactants are non-ionic surfactants.

A suitable surfactant has the formula: R—O-$EO_x$, wherein R is a $C_6$-$C_{18}$ alkyl, and x is from 1 to 30. Suitable surfactants are Lutensol AO series of surfactants from BASF and Lutensol TO series of surfactants from BASF.

A suitable surfactant has the formula: R—O-$EO_xPO_y$, wherein R is a $C_6$-$C_{18}$ alkyl, x is from 1 to 20, and y is from 1 to 20. Suitable surfactants are Dehypon LS series of surfactants from BASF.

A suitable surfactant has the formula: R—O—$PO_yEO_x$, wherein R is a $C_6$-$C_{18}$ alkyl, x is from 1 to 20, and y is from 1 to 20. Suitable surfactants are Ecosurf EH series of surfactants from Dow.

A suitable surfactant has the formula: R—O-$EO_xPO_yEO_x$, wherein R is a $C_6$-$C_{18}$ alkyl, each x is independently from 1 to 20, and y is from 1 to 20. A suitable surfactant is Plurafac LF403 from BASF.

A suitable surfactant has the formula: R—O—$PO_yEO_x$-$PO_y$, wherein R is a $C_6$-$C_{18}$ alkyl, x is from 1 to 20, and each y is independently from 1 to 20. A suitable surfactant is Plurafac SLF180 from BASF.

A suitable surfactant has the formula: HO-$EO_xPO_yEO_x$—H, wherein, each x is independently from 1 to 50, and y is from 1 to 50. Suitable surfactants are the Pluronic PE series of surfactants from BASF, and the Tergitol L series of surfactants from Dow.

A suitable surfactant has the formula: HO—$PO_yEO_x$-$PO_y$—H, wherein x is from 1 to 50, and each y is independently from 1 to 50. Suitable surfactants are the Pluronic RPE series of surfactants from BASF.

Other suitable surfactants include hydroxy mixed ether surfactants. The hydroxy mixed ether surfactants can be modified and/or endcapped. Suitable hydroxy mixed ether surfactants are Dehypon E127 and Dehypon GRA, both from BASF.

A suitable surfactant is amine oxide,

A suitable surfactant is betaine.

A suitable surfactant is an anionic surfactant selected from alkyl ether sulphates, alkyl sulphates, alkyl sulphonates, and any combination thereof.

Other Ingredients

Other suitable ingredients include aesthetic ingredients, fillers, glass care ingredients, metal care ingredients, perfumes, solvents, suds control agents, and any combination thereof.

Suitable fillers include sulphate salts. Suitable sulphate salts are alkali metal salts of sulphate and/or alkaline earth metal salts of sulphate. Preferred sulphate salts are selected from magnesium sulphate, sodium sulphate, and any combination thereof, most preferably sodium sulphate.

Suitable glass care ingredients include zinc-containing compounds. Suitable zinc-containing compounds include hydrozincite.

Suitable metal care ingredients include benzotriazole (BTA), tolyltriazole (TTA), their salt-forms, and any combination thereof. Preferred salt-forms are sodium forms of BTA and TTA.

Suitable solvents include alkanolamines, polyethers, polyols, and any combination thereof.

Suitable alkanolamines are selected from monoethanolamine, diethanolamine, triethanolamine, and any combination thereof.

Suitable polyethers are selected from glycerol ethers, polyethyleneglycol (PEG), polypropyleneglycol (PPG), glycol ethers, and any combination thereof. Suitable glycol ethers are the E-series and P-series of glycol ethers from Dow.

Suitable polyols are selected from propanediol, glycerol, sorbitol, and any combination thereof.

The solvent can act as a process aid and/or a benefit agent.

EXAMPLES

Example

Four automatic dishwashing Compositions (Compositions 1 to 4) were made and tested as detailed herein below.

Preparation of Test Compositions

Tests were carried out using the following detergent compositions.

| | Active Weight (g) | | | |
|---|---|---|---|---|
| | Composition 1 | Composition 2 | Composition 3 | Composition 4 |
| Sodium Carbonate | 3.5 | 3.5 | 3.5 | 3.5 |
| Sodium 1-hydroxyethyidene-1,1-diphosphonate | 0.8 | 0.8 | 0.8 | 0.8 |
| Sodium Silicate | 0.4 | 0.4 | 0.4 | 9.6 |
| Dipicolinic acid and/or salt thereof | 0.0 | 4.5 | 4.5 | 4.5 |
| Tetraacetyl-ethylenediamine | 0.4 | 0.4 | 0.4 | 0.4 |

-continued

| | Active Weight (g) | | | |
|---|---|---|---|---|
| | Composition 1 | Composition 2 | Composition 3 | Composition 4 |
| Acusol ™ 588GF (sulfonated polymer supplied by DowChemical) | 0.3 | 0.3 | 0.3 | 0.3 |
| Amylase granule | 0.003 | 0.003 | 0.003 | 0.003 |
| Protease granule | 0.038 | 0.038 | 0.038 | 0.038 |
| MnTACN | 0.002 | 0.002 | 0.002 | 0.002 |
| Sodium Percarbonate (13.4% Available Oxygen) | 2.8 | 2.8 | 2.8 | 2.8 |
| Plurafac ® SLF180 (non-ionic surfactant supplied by BASF) | 0.8 | 0.8 | 0.8 | 0.8 |
| Lutensol ® TO 7 (non-ionic surfactant supplied by BASF) | 0.9 | 0.9 | 0.9 | 0.9 |
| Benzotriazole | 0.008 | 0.008 | 0.008 | 0.008 |
| Perfume | 0.1 | 0.1 | 0.1 | 0.1 |
| Water | 0.1 | 0.1 | 0.1 | 0.1 |
| Refined Glycerine | 0.022 | 0.022 | 0.022 | 0.022 |
| Dipropylene Glycol | 0.4 | 0.4 | 0.4 | 0.4 |
| Aesthetic Dye | 0.012 | 0.012 | 0.012 | 0.012 |

Test Items

The following test items were used:

| Supplier | Brand | Item |
|---|---|---|
| Libbey (or retailers) | Libbey Heavy Base 11 oz Collins Glass | Collins Glass |

Additional Ballast Soil 1

To add extra soil stress to the test, a blend of soils was added to the dishwasher, as prepared by the procedure described below.

| Ingredient | % content |
|---|---|
| Potato Starch | 5.6 |
| Wheat Flour | 4.5 |
| Vegetable oil | 4.4 |
| Margarine | 4.4 |
| Lard | 4.4 |
| Single Cream | 9.0 |
| Baking Spread | 4.4 |
| Large Eggs | 9.0 |
| Whole Milk | 9.0 |
| Ketchup | 3.0 |
| Mustard | 4.0 |
| Benzoic acid >99% | 0.8 |
| Water (15-18 grains per US gallon) | 37.5 |
| Total | 100 |

Soil Preparation

1. Add water to the potato starch and leave to soak overnight. Then heat in a pan until the gel formed is properly inflated. Leave the pan to cool at room temperature overnight.
2. Weigh out the appropriate amounts of each ingredient.
3. Add the Ketchup and mustard to a bowl and mix vigorously until fully combined, 1 minute.
4. Melt Margarine, lard and baking spread individually in a microwave and allow to cool to room temperature then mix together.
5. Add Wheat Flour and Benzoic acid to a bowl and mix vigorously.
6. Break eggs into a bowl and mix vigorously.
7. Add vegetable oil to the eggs and stir using a hand blender.
8. Mix the cream and milk in a bowl.
9. Add all of the ingredients together into a large container and mix using a blender for ten minutes.
10. Weigh out 50 g batches of this mixture into plastic pots and freeze.

Test Wash Procedure—Glass Clarity Test

Automatic Dishwasher: Miele, model GSL2

Wash volume: 5000 ml

Water temperature: 50° C.

Water hardness: 20 gpg

Detergent addition: Added into the bottom of the automatic dishwasher after the initial pre-wash is complete.

Positioning of test items: 4× Collins glasses on top rack

Additional soil stress: 2×50 g pots of Additional ballast soil 1 added to bottom rack at the start of the wash cycle.

One dose of detergent, as detailed in the table below, was added to the automatic dishwasher.

| Example | Composition | pH of Formula |
|---|---|---|
| Formula A | 10.585 g Active composition 1 | 10.847 |
| Formula B | 15.085 g Active composition 2 + 32 ml 1M NaOH | 10.498 |
| Formula C | 15.085 g Active composition 3 | 9.324 |
| Formula D | 24.285 g Active composition 4 | 10.526 |

The pH of each Formula measured in 1 wt. % solution in deionised water at room temperature.

A dishwasher was loaded with the items as detailed above which were washed using Formulas A-D. The items were washed 30 times repetitively as detailed above with the same detergent and the items were then graded using an Image Analysis System for item clarity where a higher clarity is desired.

| | Results - Glass Clarity (% Clarity) |
|---|---|
| Formula A (Comparative) | 78.9 |
| Formula B | 91.6 |
| Formula C | 94.1 |
| Formula D (Comparative) | 84.8 |

As can be seen from the above Glass Clarity Measurements, Examples B & C of the present disclosure have improved clarity than Examples A and D which are outside the scope of the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any example disclosed or claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of the present disclosure.

What is claimed is:

1. A water-soluble automatic dishwashing detergent pouch, wherein the pouch comprises an automatic dishwashing detergent composition that is enclosed by a water-soluble film, wherein the automatic dishwashing detergent composition comprises:

(a) from about 1.0 g to about 20 g of dipicolinic acid and/or salt thereof; and (b) from above 0 g to less than about 8.0 g of silicate salt, with a level of the silicate salt being less than about 3.0 wt. % of the automatic dishwashing detergent composition, and wherein a weight ratio of the dipicolinic acid and/or salt thereof to the silicate salt is greater than about 5:1.

2. The pouch according to claim 1, wherein the automatic dishwashing detergent composition comprises:

from about 0.1 g to less than about 8.0 g of the silicate salt.

3. The pouch according to claim 1, wherein the silicate salt is an alkali metal salt of silicate.

4. The pouch according to claim 1, wherein the silicate salt is sodium silicate.

5. The pouch according to claim 1, wherein the dipicolinic acid and/or salt thereof is present in a solid component of the automatic dishwashing detergent composition.

6. The pouch according to claim 1, wherein the automatic dishwashing detergent composition further comprises a transition metal bleach catalyst.

7. The pouch according to claim 1, wherein upon dilution in deionized water at about 20° C. temperature to a concentration of about 10 g/l, the automatic dishwashing detergent composition has an equilibrium pH of less than about 10.0.

8. The pouch according to claim 1, wherein upon dilution in deionized water at about 20° C. temperature to a concentration of about 10 g/l, the automatic dishwashing detergent composition has an equilibrium pH of less than about 9.5.

9. The pouch according to claim 1, wherein the automatic dishwashing detergent composition further comprises polyepoxy succinic acid polymer.

10. The pouch according to claim 1, wherein the automatic dishwashing detergent composition further comprises from about 0.1 g to about 5.0 g of polyepoxy succinic acid polymer.

11. The pouch according to claim 1, wherein the automatic dishwashing detergent composition further comprises sulphonated carboxylate polymer.

12. The pouch according to claim 1, wherein the automatic dishwashing detergent composition further comprises from about 0.1 g to about 5.0 g of sulphonated carboxylate polymer.

13. The pouch according to claim 1, wherein the automatic dishwashing detergent composition further comprises an enzyme.

14. The pouch according to claim 1, wherein the automatic dishwashing detergent composition further comprises methylglycine diacetic acid and/or a salt thereof.

15. A method of washing dishware in an automatic dishwashing machine comprising contacting dirty dishware with the pouch according to claim 1 in the automatic dishwashing machine in the presence of water.

16. The pouch according to claim 1, wherein the weight ratio of the dipicolinic acid and/or salt thereof to the silicate salt is less than 20:1.

* * * * *